June 25, 1963 M. L. KALPIN 3,094,810
CONTAINERS FOR PLANTS AND THE LIKE
Filed Dec. 19, 1960

INVENTOR,
MAX L. KALPIN
ATTORNEYS.

United States Patent Office 3,094,810
Patented June 25, 1963

3,094,810
CONTAINERS FOR PLANTS AND THE LIKE
Max L. Kalpin, 51 Timberlane Drive,
Downsview, Ontario, Canada
Filed Dec. 19, 1960, Ser. No. 76,565
1 Claim. (Cl. 47—37)

The invention relates to containers for plants and the like and it has for its main object the provision of a container in which a seed may be sown and the plant, shrub, or the like produced therefrom grown, shipped and marketed without the necessity of transplanting.

Another object of the invention is to provide economy in storage and shipping costs by the provision of a container in the form of a bag made of semi-rigid, light material, such as plastic, moisture proof paper or cloth, capable of being folded to wafer-like thickness for storage or transportation purposes and which can be erected for the reception of soil and seed, or plants, to be contained therein simply by straightening up the material comprising the body of the container, which can be accomplished by hand usually in two or three seconds.

A further object of the invention is to provide a container having a body of a material which can readily be cut vertically so that a plant and the soil in which it is embedded can be removed as a unit without disturbing the roots.

And generally the objects of the invention are to provide a container of light and sturdy construction, having the required requisites for the promotion of plant growth and which can be produced at such small cost as to make it economically disposable after use.

With the above and other objects in view the invention consists in the novel features of construction, arrangements and combinations of parts set out in the present specification and more particularly pointed out in the claim for novelty following.

In describing the invention reference will be made to the accompanying drawings, in which.

Like numerals of reference indicate corresponding parts in the various figures.

Figure 1:
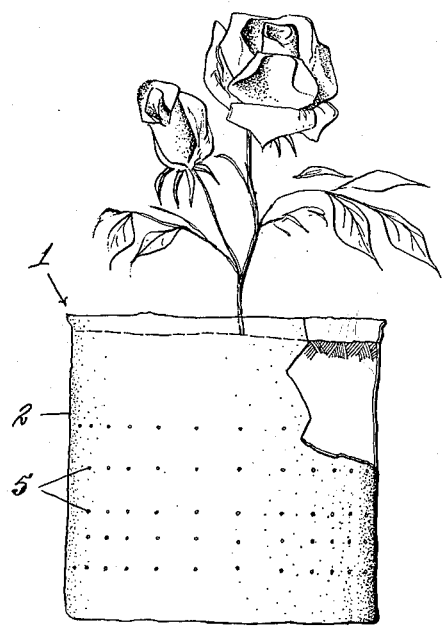
FIGURE 1 is a side elevation of my improved plant container with a plant embedded in soil therein, a portion of the body being broken away to disclose the soil therein.
Figure 2:
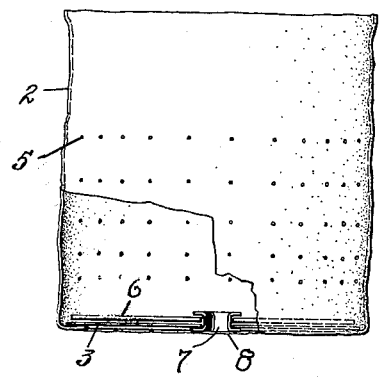
FIGURE 2 is a side elevation of a container standing empty, a portion of the body being broken away to show the stiffening insert in the bottom.
Figure 4:
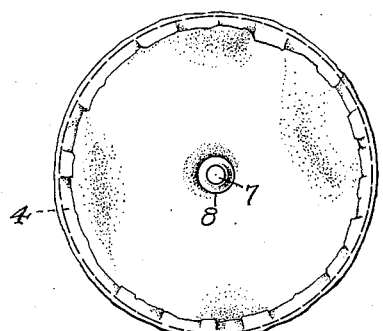
FIGURE 4 is a bottom view.

Referring to the drawings in which a complete embodiment of the invention is shown to illustrate the principle thereof, 1 designates generally my plant container which is shown herein as circular in body cross section, although, of course, it may be made of any desired shape, such for instance as elliptical, rectangular, or square. The container is made from some semi-rigid material such as plastic, waterproofed paper or cloth, or other suitable material capable of withstanding varied temperatures between wide extremes of heat and cold, and being readily foldable.

The container consists of a body 2 which may be molded to the desired cross sectional shape, as shown in the drawings, or may be formed of sheet material suitably seamed. The body is closed at one end by a bottom 3, which is shown herein as having its marginal part 4 folded inwardly and secured by suitable means to the inturned edge of the body. The body and bottom may, of course, be molded or otherwise formed in one piece to provide a bag-like structure.

The body of the container is shown in FIGURE 1 of the appropriate depth to accommodate the amount of soil required for the growth of a young plant, with the top edge of the container being just above the level of the soil, and for a considerable part of the depth of the container, spaced somewhat from its top and bottom, the body is provided with a plurality of minute apertures 5 arranged circumferentially thereof, through which air is adapted to pass to the soil.

As means for stabilizing the container so that it will stand erect on its bottom, a disc-like device of a relatively stiff and inexpensive material, such as cardboard or plastic, cut to the shape of the bottom 3 is placed within the bag to lie on said bottom, to which it is preferably fastened against displacement.

The bottom 3 and the disc-like member 6 are apertured in vertical registering relation to provide a drainage passage leading to the exterior of the container to relieve the soil of excess moisture.

The preferred means for securing together the disc 6 and the bottom 3 and at the same time provide the discharge passage 7 comprises an eyelet 8 passing through the registering apertures in the said elements 6 and 3 and having its ends turned backwards over the marginal parts of said elements around the said apertures, respectively. While the registering apertures through the disc 6 and the bottom 3 are shown as being concentric to the said elements it is to be understood that such openings and the eyelet passing therethrough may be eccentric to said elements, so long as proper drainage of the moisture from the soil is provided for.

Figure 3:
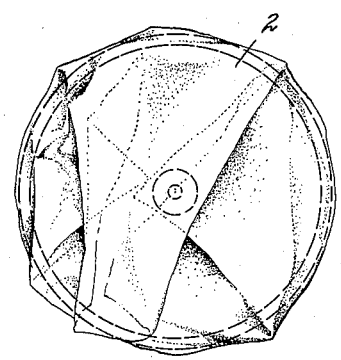
FIGURE 3 is a plan view of the container folded.
Figure 5:
FIGURE 5 is an edge view of FIGURE 3.

Containers constructed according to the present invention are of special advantage to nurserymen and other growers of plants on a large scale, for various reasons, one reason being that owing to their lightness and lack of bulk when folded to the flat condition shown in FIGURE 3, they may be purchased in large quantities against future use and stored in small space. Another advantage is that they can be conveniently placed in the ground and provided with appropriate plant growing material in which the seed is embedded. A further advantage lies in the fact that during the germinal period or the period of development of very young and delicate plants, where climatic conditions, such as extreme cold, make protection desirable, the portion of the flexible bag above the level of the matter therein may be folded over the contents and tied to protect the seed or plant.

During the period of seed germination, plant growth, shipment and marketing, water can be fed to the soil and any excess will be drained off through the passage 7, while air necessary to the growth of the plant will be admitted through the apertures 5 in the body.

Removal of the plant from a container together with the soil in which the plant is embedded, as for transplanting purposes, can be quickly accomplished without disturbing the plant roots, simply by slitting the soft body of the container from top to bottom to expose the packed contents which can then be easily removed.

Figure 6:
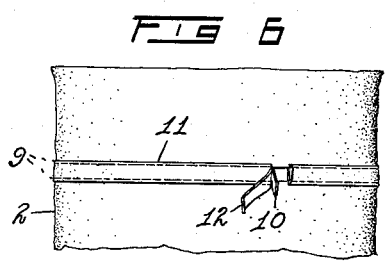
FIGURE 6 is a fragmentary side elevation of a modified body construction with means for trimming down the body height.

In FIGURE 6 a modified construction is shown wherein means is provided for conveniently severing an upper portion of the body of a container which is too deep for the occasion. In this embodiment the body is weakened between score lines 9 circumferentially thereof to provide a readily removed band 10 and a pull strip 11 is glued, or otherwise secured, to the outer surface of said band with an end part 12 left projecting so that when the loose end part is pulled the weakened band part 10 will be dislodged and so cause separation of the part of the body above the said weakened part.

Figure 7:
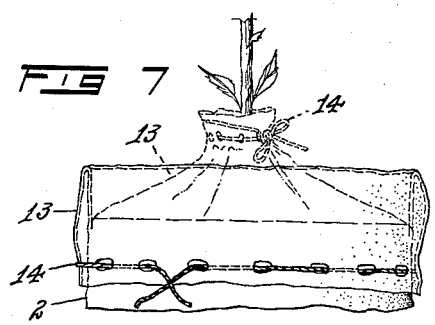
FIGURE 7 is a broken side elevation of a modified form of container.

In FIGURE 7 a modified form of container is shown wherein the upper marginal part 13 thereof, from the intended soil level, may be extended upwards and drawn together over the contents of the container where such contents consist of planted seed only, or around the stem of a plant therein, by means of a draw string 14 threaded through suitable apertures in said marginal part. By this means a growing plant will be stabilized and the soil in which it is embedded will be prevented from being spilled, which is very important, particularly where plants are being shipped long distances, as from overseas, during which the container might be subjected to rough handling.

While I have shown and described herein the present preferred construction and arrangement of parts for carrying out my said invention, these are capable of variation and modification. I, therefore, do not wish to be limited to the precise details of construction and arrangement shown herein but desire to avail myself of such variations and modifications as come within the scope of the appended claim.

What I claim as my invention is:

A plant container comprising a bottom and a body rising from said bottom made of a semi-rigid sheet plastic material, said body being adapted to stand erect to allow insertion of soil and planted matter and being readily foldable to a flat condition parallel to said bottom when the bag is empty, an insert of a relatively inflexible material seated on said bottom, said insert and said bottom being apertured in vertical alignment, an eyelet passing through said aligned apertures and securing said insert to said bottom, said eyelet providing a drainage passage leading to the exterior of the bag, said body having a plurality of air passages therethrough.

References Cited in the file of this patent

UNITED STATES PATENTS

| | | |
|---|---|---|
| 254,440 | Kurtz | Feb. 28, 1882 |
| 1,988,691 | Lovett | Jan. 22, 1935 |
| 2,079,116 | Gardner | May 4, 1937 |
| 2,189,889 | Engel | Feb. 13, 1940 |

FOREIGN PATENTS

| | | |
|---|---|---|
| 323,839 | Switzerland | Oct. 15, 1957 |